United States Patent [19]

Deutsch et al.

[11] Patent Number: 4,850,184
[45] Date of Patent: Jul. 25, 1989

[54] ROTATING MOISTENER COLUMN FOR A COTTON HARVESTER

[75] Inventors: Timothy A. Deutsch, Newton; Donald H. Sheldon, Jr., Des Moines, both of Iowa

[73] Assignee: Deere & Company, Moline, Ill.

[21] Appl. No.: 174,285

[22] Filed: Mar. 28, 1988

[51] Int. Cl.$^4$ ............................................. A01D 46/18
[52] U.S. Cl. ............................................. 56/41; 56/40
[58] Field of Search ............................... 56/28, 40, 41

[56] References Cited

U.S. PATENT DOCUMENTS 2,795,096  6/1957  Meier ..................................... 56/41
4,461,140  7/1984  Carmi et al. ........................... 56/41

Primary Examiner—John Weiss

[57] ABSTRACT

A vertically adjustable and rotatable moistener column for a cotton picker row unit. The moistener column includes rotating base structure permitting the column to be rotated between a normal operating position and a service position wherein access to the pad supports and moistener pads is facilitated. The rotating base includes indexing structure for firmly securing the moistener column in either the operating or the service position and for facilitating rotation of the column between positions after moving the column vertically.

12 Claims, 3 Drawing Sheets

ROTATING MOISTENER COLUMN FOR A COTTON HARVESTER

BACKGROUND OF THE INVENTION

The present invention relates generally to a cotton harvester and more particularly to a moistener column for a cotton picker row unit.

In a conventional cotton harvester, a pair of upright picker drums with laterally extending and vertically spaced picking spindles are supported within a row unit housing for projecting into the path of a row of cotton plants to remove the cotton therefrom. A doffing mechanism within the row unit removes the cotton from the spindles and discharges the cotton into a conveying system. After the cotton is doffed from the spindles, the spindles pass under the pads of a vertical moistener column which clean plant juices and other debris from the surface of the spindles. The moistener column includes an upright frame carrying a plurality of pad support arms which project laterally toward the spindles. Each pad support arm carries a flexible moistener pad having fins which project downwardly into a wiping relationship with the passing spindles. A fluid supply system extends through the column and provides cleaning fluid through each of the arms to the pads. The column is supported from an upper panel of the row unit by an adjustable bracket arrangement which permits the column to be adjusted vertically so that the fins of the pads are in proper wiping relationship with the passing spindles.

The moistener column requires regular servicing, for example, to replace worn or cracked and broken moistener pads. At other times it may be necessary to service other areas adjacent the moistener column. Heretofore, servicing the moistener columns and the adjacent areas of the picking units has been difficult because the column is bolted in a position that is hard to access. Typically, the column is at the forward pass of the spindles on the picker drum adjacent the row receiving area. It is necessary that the pads project into the paths of the spindles on the drum, and therefore removing the pads is a difficult and time-consuming task.

The moistener pads includes a base portion which must be stretched over the pad receiving portions of the pad arms. To prevent the pads from coming off during picker operation, a very tight fit is provided. This makes removal of the pad and attachment of the pad very difficult, particularly in the limited space available around the moistener column. To attach a pad, it is necessary that the operator reach around the back of the pad to pull it onto the pad receiving portion of the arm, which is a very tedious task because of the space limitations.

BRIEF SUMMARY OF THE INVENTION

It is therefore an object of the present invention to provide an improved moistener column assembly. It is a further object to provide such an assembly which overcomes the aforementioned problems.

It is still another object of the present invention to provide an improved moistener column for a cotton harvester row unit which facilitates servicing of the row unit and moistener column. It is another object to provide such a moistener column which is easily positionable between service and operating positions. It is another object to provide such a moistener column wherein convenient access to the moistener pads is provided without need to remove the column from the row unit.

It is still a further object of the present invention to provide an improved moistener column for a cotton harvester row unit wherein the column is rotatable between a normal operating position and a service position. It is a further object to provide such a column having a relatively simple and reliable mount which firmly supports the column in either the working or the service position while facilitating movement from one position to the other.

It is a further object of the present invention to provide an improved moistener column assembly which increases the space available for access to the pads, particularly to the rear of the pads, to facilitate attachment of the pads to the pad receiving portions of the arms.

In accordance with the above objects, a spindle moistener column is provided having a rotating base mounted on a floor bracket and including indexing structure for firmly supporting the moistener column in a first operating position and a second service position angularly rotated from the operating position. The rotating base includes a slotted column receiving portion for maintaining the bottom of the moistener column with respect to the rotational axis of the rotating base. The lower end of the column is pinned to the slotted portion and the pin is movable vertically within the slots. The slotted portion includes a bore housing a coil spring which biases the pin and therefore the column upwardly. The slotted portion is bolted to the rotating base, and the bolts include headed portions which extend below the base to act as pin structure adapted for receipt in either of two pairs of apertures corresponding respectively to the field and service positions of the column. An adjusting bolt bears down against the top of the column against the bias of the spring to maintain the pads in preselected vertical positions relative to the spindles. As the pads wear, the adjusting bolt may be threaded downwardly to move the column against the bias of the spring and lower the pads relative to the spindles. To rotate the moistener column from the operating to the service position, the adjusting bolt is raised to permit the spring to bias the column to the upwardmost position. The rotating base is then lifted to raise the bolt heads from the first set of apertures. Thereafter, the column is rotated until the bolt heads are aligned with the second set of apertures and the rotating base settles downwardly with the bolt heads securing the columns in the service position. The operator then has easy access to the pads for replacing the pads or servicing other areas in the vicinity of the moistener column. Once the servicing is complete, the rotating base is lifted and rotated back to the operating position wherein the bolt heads again move into the first set of apertures to securely hold the column in the operating position. The rotating base is relatively simple and inexpensive in construction and permits the column to be easily positioned for service. After service the column may be quickly and easily rotated back to the working position. Once in the working position, the adjusting bolt is adjusted downwardly to move the column against the bias of the spring until the pads are in proper vertical relationship with respect to the spindles.

These and other objects, features and advantages of the present invention will become apparent to those

3 skilled in the art from the description which follows and from the drawings.

DESCRIPTION OF THE PREFERRED EMBODIMENT

Figure 1:
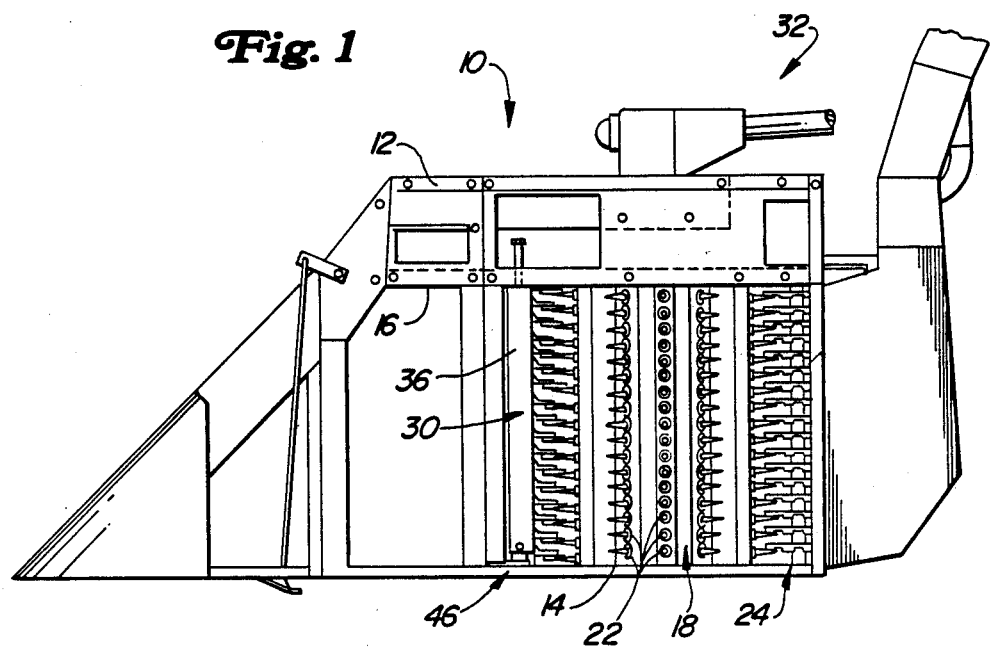
FIG. 1 is a side view of a cotton harvester row unit with parts removed to more clearly show the spindle drum and moistener column assemblies.
Figure 2:
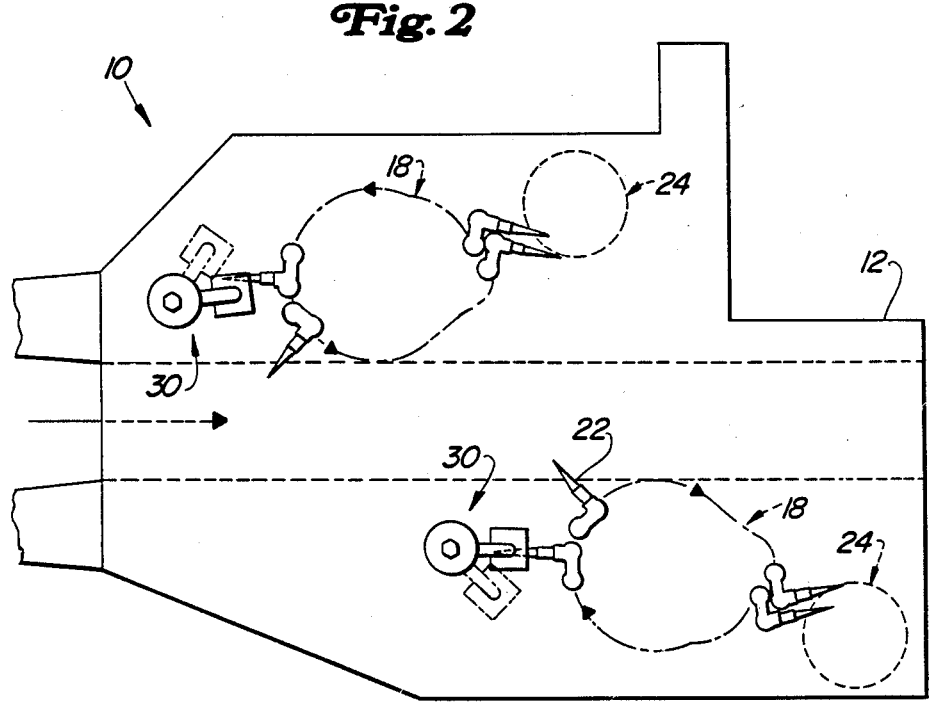
FIG. 2 is a top view of the row unit of FIG. 1 showing the moistener column in the operating and service (broken lines) positions.

Referring to FIG. 1, there is shown a cotton harvester row unit 10 having a housing 12 with a floor 14 and an intermediate panel 16. An upright picker drum 18 is rotatably mounted between the floor 14 and panel 16 and includes spindles 22 which project into the path of the cotton plants for removing cotton therefrom. An upright doffer column 24 doffs the cotton from the spindles 22. A moistener column 30 is located at the forward side of the drum 18 for cleaning the spindles 22 prior to their reentry into the row receiving area. The harvesting mechanism within the housing 12 is driven by a conventional drive mechanism indicated generally at 32. The row unit 12 is generally of conventional construction, and such as exemplified by the commercially available John Deere Model 9950 cotton harvester, and therefore is described only in sufficient detail to orient the moistener column assembly 30 of the present invention.

Figure 3:
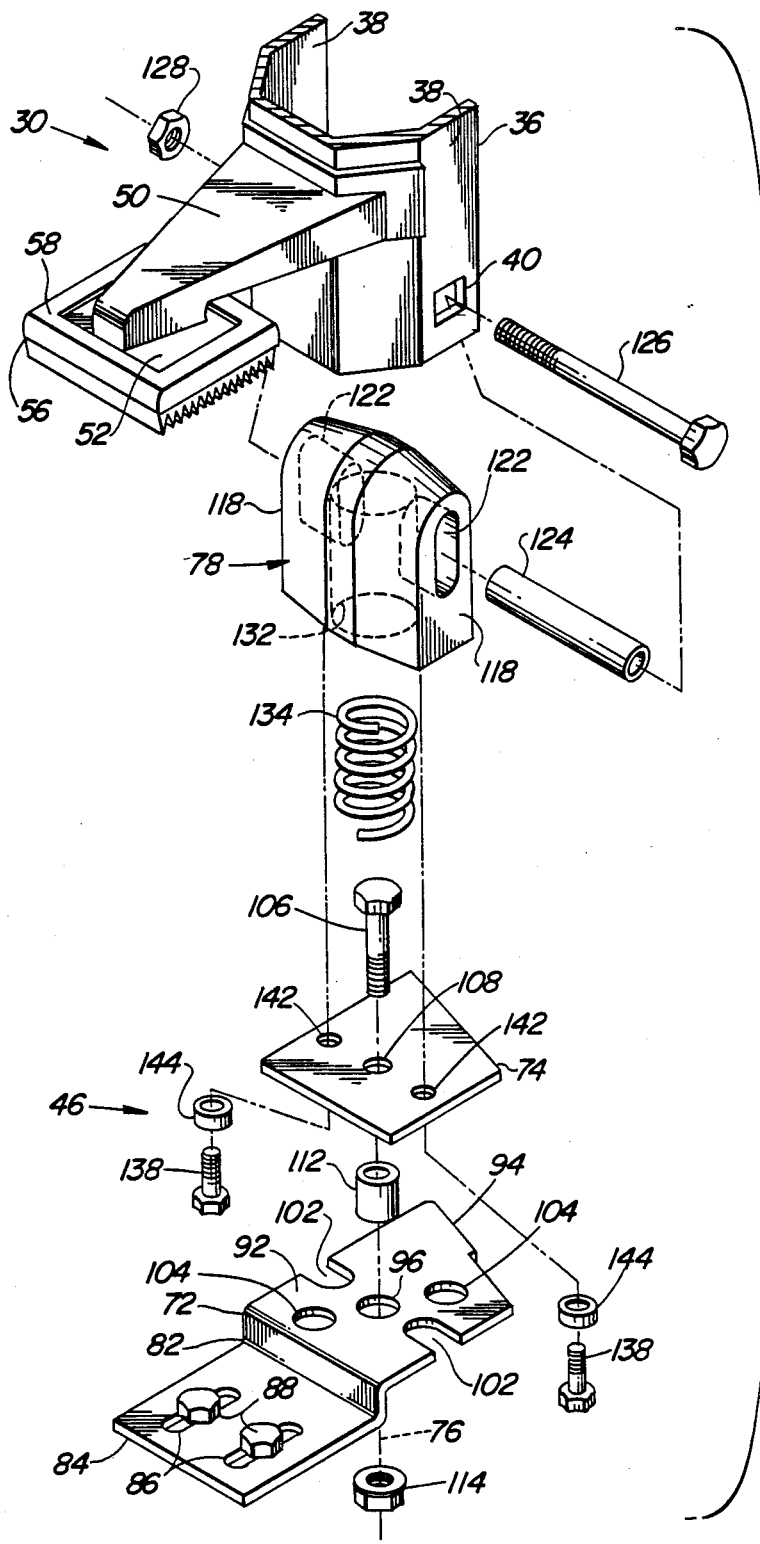
FIG. 3 is an exploded view of the moistener column base.
Figure 4:
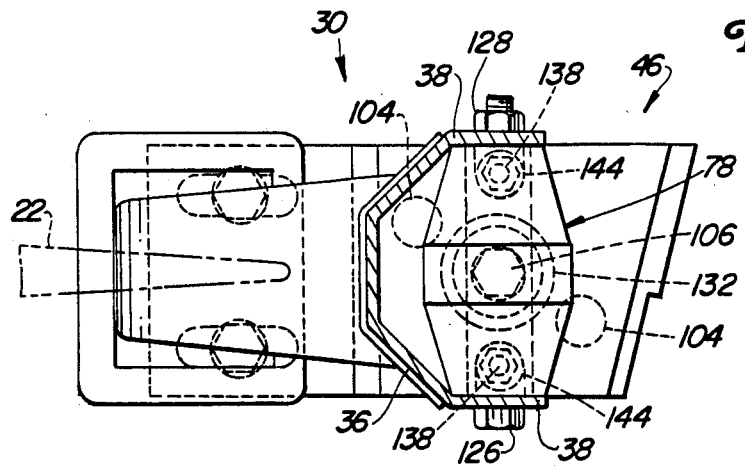
FIG. 4 is a top view of the moistener column in the operating position.
Figure 5:
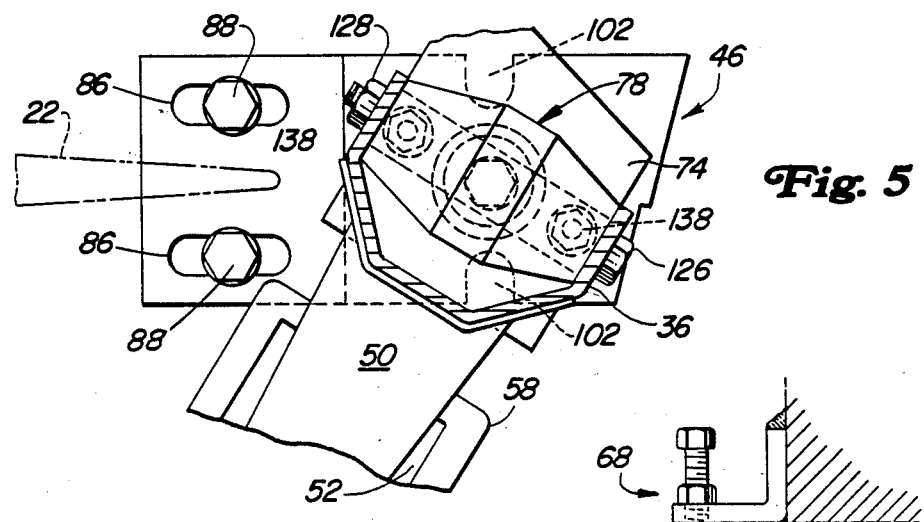
FIG. 5 is a view similar to FIG. 4 but showing the moistener column rotated to the service position.
Figure 6:
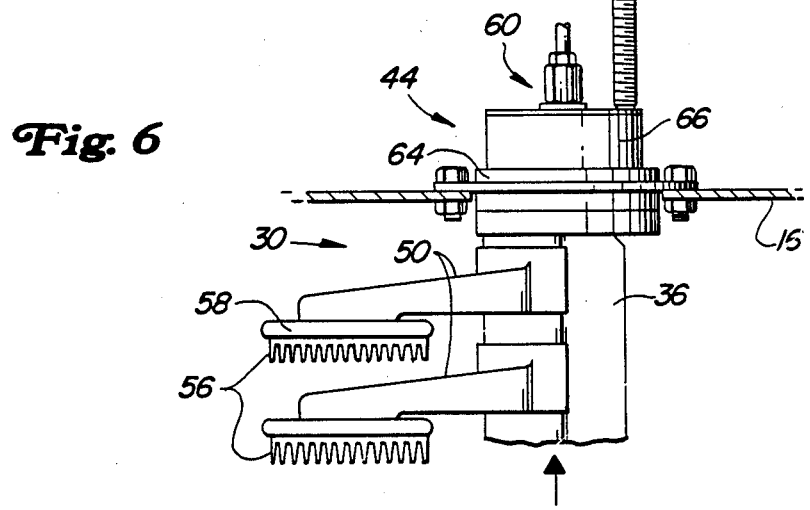
FIG. 6 is an enlarged view of the top portion of the moistener column.

The moistener column assembly 30 includes an upright column frame 36 having a generally channel-shaped configuration (FIGS. 3–5) with parallel sides 38 having lower apertures 40 formed therein. The column frame 36 is supported between the floor 14 and the intermediate panel 16 of the housing 12 by upper and lower support structures 44 and 46, respectively. Vertically spaced pad arms 50 (FIG. 3) are connected to the face of the column frame 36 and extend outwardly therefrom in vertically spaced relationship. A pad support 52 is connected to the end of the arm 50. A moistener pad 56 includes a pad base 58 which fits over the pad support 52. The pad base 58 is stretched over the pad support 52 to provide a snug fit between the pad and the base to prevent the pad from coming off the support during picking. A conventional fluid distribution system indicated generally at 60 of FIG. 6 distributes fluid through individual conduits (not shown) which extend down through the column frame 36 and through the individual arms 50 to the corresponding pad bases 58. The fluid passes through the pad base 58 and onto the fins of the pad 56 to help clean plant juices and debris from the spindles as they pass under the pads.

The upper support structure 44 (FIG. 6) includes a cylindrically shaped member 64 which slidably and rotatably receives upper end 66 of the moistener column assembly 30. Column assembly 30 can rotate within the member 64 about the axis of the member and can also move vertically in the axial direction. An adjusting bolt 68 is provided for moving the column 30 vertically to provide proper vertical relationship between the moistener pads 56 and the rows of spindles 22 which pass under the pads. The operation of the adjusting bolt 68 will be described in detail below.

The lower support structure 46 includes a floor bracket 72 rotatably mounting a base 74 for rotation about an upright axis 76. A slotted column-receiving portion 78 is attached to the plate 74 and supports the lower end of the column frame 36 for rotation about the axis 76 and for axial movement generally along the axis 76 as the bolt 68 is adjusted. The floor bracket 72 includes an angle 82 having a lower flange 84 which is slotted at 86 to receive mounting bolts 88. The mounting bolts 88 extend through the slots 86 and through the floor 14 to secure the floor bracket 72 in position. The bracket 72 includes a flange 92 which is offset from the floor. An end flange 94 extends downwardly from the end of the offset flange 92 to firmly support the flange 92 above the floor. The flange 92 includes a central aperture 96 which is centered on the upright axis 76. A first set of diametrically opposed apertures 102 is provided near the edges of the flange 92. A second set of diametrically opposed apertures 104 is offset angularly from the first set, preferably by approximately sixty degrees. The base 74 is rotatably mounted on the floor bracket 72 by a bolt 106 which passes through a central aperture 108 in the base 74 and through a spacer 112 which bears against the lower side of the plate 74 and extends through the center aperture 96 of the floor bracket 72. A nut 114 is threaded on the end of the bolt 106 to secure the base 74 for rotation on the floor bracket 72.

The slotted column-receiving portion 78 includes sides 118 adapted to be received between the sides 38 of the column frame 36. The portion 78 is slotted at 122, and a spacer 124 is inserted in the slot and extends between the sides 118. The column-receiving portion 78 is inserted between the sides 38 and a bolt 126 is inserted through the holes 40 in the sides 38 and through the spacer 124. A nut 128 retains the bolt in position on the column frame 36. A vertical, spring-retaining bore 132 extends upwardly from the bottom of the column-receiving portion 78 to the top of the slots 122. A coil spring 134 having an outer diameter approximately equal to but slightly less than the diameter of the bore 132 is inserted in the bore and bears against the bottom of the spacer 124. The column-receiving portion 78 is secured to the rotating base 74 by a pair of bolts 138 passing upward through holes 142 in the plate 74 and through internally threaded holes in the bottom portion of the column-receiving portion 78. With the slotted column-receiving portion 78 secured in position on the plate 74, the spring 134 is positioned at its lower end over the head of the bolt 106 and biases the bushing 124 and therefore the pin 126 and column frame 36 upwardly. The adjusting bolt 68 (FIG. 6) pushes the column 36 downwardly against the bias of the spring 34 as the bolt 68 is threaded downwardly against the top of the column assembly 30.

The apertures 142 are located radially outwardly from the axis 76 approximately the same distance that the first and second sets of apertures 102 and 104, respectively, are located radially outwardly from the axis. Spacers 144 inserted over the shanks of the bolts 138 are tightened between the heads of the bolts 138 and the bottom of the plate 74 to act as pins which are selectively received in either of the first and second sets of apertures 102 and 104. When the column assembly 30 is in the normal operating position (FIG. 4), the bolts 138 and spacers 144 are received within the first apertures 102. The floor bracket 72 therefore firmly secures the rotating base 74 and thus the column frame 36 in the operating position. When it is necessary to service the row unit 10, the adjusting bolt 68 may be unthreaded to raise the bolt and therefore permit the spring 134 to bias the spacer 124 and thus the bolt 126 and column frame 36 to the upwardmost position in the slots 122. Further unthreading of the bolt 68 permits the entire moistener column assembly 30 to be raised a sufficient distance so that the bolts 138 clear the top of the offset flange 92. The plate 74 may then be rotated until the bolts 138 align with the second set of apertures 104. Thereafter the column 30 is lowered so that the bolts 138 enter the apertures 104 thereby securing the plate against rotation. The pad arms 50 are now rotated approximately sixty degrees from the operating position to a service position (FIG. 5) wherein the pad arms 50 project toward the service opening on the row unit so that the operator may more easily gain access to the area around the moistener column assembly 30, particularly to the moistener pads 56 for more easily removing and replacing the pads 56 on the pad supports 52. With the bolts 138 seated within the apertures 104, the operator may work on the moistener pads 56 while the column is firmly supported in a convenient position much more accessible than the operating position of FIG. 4. Once the servicing is complete, the operator lifts the moistener column assembly 30 until the bolts 138 clear the apertures 104. Thereafter the operator rotates the column in the clockwise direction (FIG. 3) until the bolts 138 align with the first set of apertures 102. The column is released and the bolts 138 drop into the apertures 102 to secure the column assembly 30 in the operating position. The operator then threads the adjusting bolt 68 downwardly against the top of the assembly 30 to urge the column frame 36 downwardly against the bias of the spring 134 until the moistener pads 56 are in the optimum vertical adjustment relative to the spindles 22.

Having described the preferred embodiment, it will be apparent that modifications can be made without departing from the scope of the invention as defined in the accompanying claims.

We claim:

1. In a cotton harvester including an upright spindle drum supported in a row unit housing, an improved moistener column assembly for cleaning the spindles, said assembly comprising:

an upright column frame having upper and lower ends;

means supporting the upper end of the column frame adjacent the spindle drum for rotation about an upright axis and for vertical movement relative to the spindle drum;

means rotatably supporting the lower end of the column frame adjacent the spindle drum for rotation about the upright axis;

pad receiving arms extending outwardly from the column frame in vertically spaced relationship and supporting replaceable spindle wiping pads for contacting the spindles;

means for selectively maintaining the column frame in first and second rotated positions, the first position corresponding to an operating position wherein the pad receiving arms extend toward the spindle drum and the second position corresponding to a service position wherein the arms are rotated a substantial angle about the axis away from the spindle drum to provide access to the arms and spindle wiping pads;

means for moving the column frame vertically to adjust the location of the pads relative to the spindles;

indexing means for firmly securing the column frame in the first and second rotated positions; and wherein the means rotatably supporting the lower end of the column frame comprises a base member rotatably connected to the housing for rotation about the upright axis and wherein the indexing means comprises pin structure and mating aperture structure associated with the base member.

2. The invention as set forth in claim 1 wherein the means for moving the column vertically includes means for selectively moving the pin structure and mating aperture structure into and out of a locking relationship with each other.

3. The invention as set forth in claim 1 wherein the pin means comprises a fastener located at the lower end of the column and the aperture structure includes a bracket having first and second aperture means for selectively receiving the pin means and securing the column frame in the first and second rotated positions, respectively.

4. The invention as set forth in claim 1 wherein the means for moving the column frame vertically includes an adjustable length member supported by the housing and urging the column frame downwardly, and the base member includes spring means yieldingly biasing the column frame upwardly against the adjustable length member.

5. The invention as set forth in claim 4 wherein the pin structure is movable out of the aperture structure as the column frame is moved vertically to thereby facilitate indexing of the column frames between the operating and service positions.

6. In a cotton harvester including an upright spindle drum supported in a row unit housing, an improved moistener column assembly for cleaning the spindles, said assembly comprising:

an upright column frame having upper and lower ends;

means supporting the upper end of the column frame adjacent the spindle drum for rotation about an upright axis and for vertical movement relative to the spindle drum;

means rotatably supporting the lower end of the column frame adjacent the spindle drum for rotation about the upright axis;

pad receiving arms extending outwardly from the column frame in vertically spaced relationship and supporting replaceable spindle wiping pads for contacting the spindles;

means for selectively maintaining the column frame in first and second rotated positions, the first position corresponding to an operating position wherein the pad receiving arms extend toward the spindle drum and the second position corresponding to a service position wherein the arms are rotated a substantial angle about the axis away from the spindle drum to provide access to the arms and spindle wiping pads;

means for moving the column frame vertically to adjust the location of the pads relative to the spindles; and wherein the means rotatably supporting the lower end of the column frame comprises a vertically slotted, column-receiving portion, a rotatable base connected to the housing, means for securing the column-receiving portion to the rotatable base for rotation therewith, means securing the lower end of the column frame to the column-receiving portion including pin means extending through the slotted portion for constraining the column frame and base for rotation together while facilitating vertical movement of the column frame relative to the base.

7. The invention as set forth in claim 6 wherein the column-receiving portion includes spring means for biasing the column frame vertically.

8. The invention as set forth in claim 7 wherein the means for moving the frame vertically includes adjusting means for urging the column against the bias of the spring means.

9. The invention as set forth in claim 8 including indexing means operable upon adjustment of the means for urging the column, said indexing means for firmly securing the column frame in the first and second positions.

10. In a cotton harvester including an upright spindle drum supported in a row unit housing, an improved moistener column assembly for cleaning the spindles, said assembly comprising:

an upright column frame having upper and lower ends;

means supporting the upper end of the column frame adjacent the spindle drum for rotation about an upright axis and for vertical movement relative to the spindle drum;

means rotatably supporting the lower end of the column frame adjacent the spindle drum for rotation about the upright axis;

pad receiving arms extending outwardly from the column frame in vertically spaced relationship and supporting replaceable spindle wiping pads for contacting the spindles;

means for selectively maintaining the column frame in first and second rotated positions, the first position corresponding to an operating position wherein the pad receiving arms extend toward the spindle drum and the second position corresponding to a service position wherein the arms are rotated a substantial angle about the axis away from the spindle drum to provide access to the arms and spindle wiping pads;

means for moving the column frame vertically to adjust the location of the pads relative to the spindles;

wherein the means rotatably supporting the lower end of the column frame comprises a support member rotatably connected to the housing, means for constraining the support member for rotation with the column frame while facilitating vertical movement of the column frame relative to the housing between a release position and an adjustable working position; and wherein the means for selectively maintaining the column frame in the rotated positions includes locking structure located between the housing and the column frame, said locking structure being selectively disengageable upon vertical movement of the column frame to the release position to facilitate rotation of the column frame between the positions.

11. The invention as set forth in claim 10 wherein the locking structure includes pin and pin-receiving structure connected between the support member and the housing.

12. The invention as set forth in claim 11 wherein the pin-receiving structure includes an opening in the support member engageable with the pin structure when the column frame is moved vertically to the working position when in the first rotated position.

* * * * *